United States Patent
Lee et al.

(10) Patent No.: US 8,130,717 B2
(45) Date of Patent: Mar. 6, 2012

(54) RANDOM ACCESS METHOD USING DIFFERENT FREQUENCY HOPPING PATTERNS BETWEEN NEIGHBORING CELLS AND MOBILE COMMUNICATION DEVICE

(75) Inventors: Hyoseok Lee, Daejeon (KR); Il-Gyu Kim, Seoul (KR); Hyeong-Geun Park, Daejeon (KR); Kapseok Chang, Daejeon (KR); Young-Jo Ko, Daejeon (KR); Young-Hoon Kim, Daejeon (KR); Seung-Chan Bang, Daejeon (KR)

(73) Assignees: Electronics and Telecommunications Research Institute, Daejeon (KR); Samsung Electronics Co., Ltd., Gyeonggi-Do (KR)

( * ) Notice: Subject to any disclaimer, the term of this patent is extended or adjusted under 35 U.S.C. 154(b) by 342 days.

(21) Appl. No.: 12/375,840

(22) PCT Filed: Jul. 30, 2007

(86) PCT No.: PCT/KR2007/003655
§ 371 (c)(1),
(2), (4) Date: Oct. 6, 2009

(87) PCT Pub. No.: WO2008/016248
PCT Pub. Date: Feb. 7, 2008

(65) Prior Publication Data
US 2010/0074191 A1 Mar. 25, 2010

(30) Foreign Application Priority Data

Jul. 31, 2006 (KR) .................. 10-2006-0072267
Jul. 19, 2007 (KR) .................. 10-2007-0072450

(51) Int. Cl.
*H04W 4/00* (2009.01)
*H04B 1/00* (2006.01)
(52) U.S. Cl. .............. 370/330; 375/132; 375/138
(58) Field of Classification Search .......... 370/328–330; 375/132, 138
See application file for complete search history.

(56) References Cited

U.S. PATENT DOCUMENTS

| 7,016,397 B1 * | 3/2006 | Vihriala | 375/143 |
| 2005/0286409 A1 | 12/2005 | Yoon et al. | |
| 2007/0177682 A1 * | 8/2007 | Han et al. | 375/260 |

FOREIGN PATENT DOCUMENTS

| JP | 2000-152343 | 5/2000 |
| WO | WO-2005/086520 | 9/2005 |
| WO | WO-2005/122616 | 12/2005 |

* cited by examiner

*Primary Examiner* — Ronald Abelson
(74) *Attorney, Agent, or Firm* — Rabin & Berdo, P.C.

(57) ABSTRACT

Provided are a random access method of a mobile station and a mobile communication device performing the same. The mobile station can obtain a diversity gain without a Random Access Channel (RACH) burst collision by hopping according to a cell group in a frequency domain and transmitting a random access when random access resources are used between neighboring cells and detect an RACH even with low transmission power by applying switching diversity together with the frequency hopping.

17 Claims, 6 Drawing Sheets

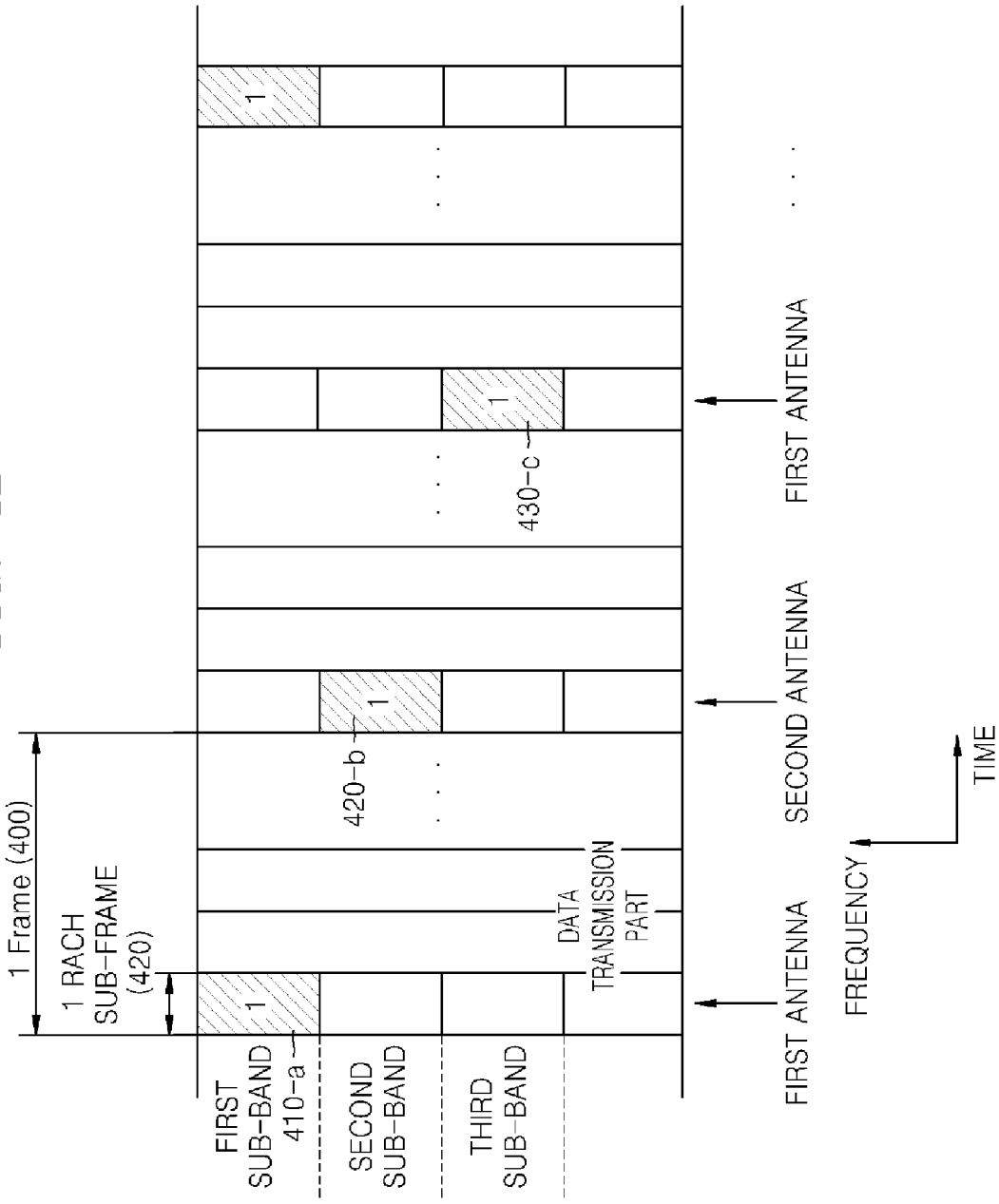

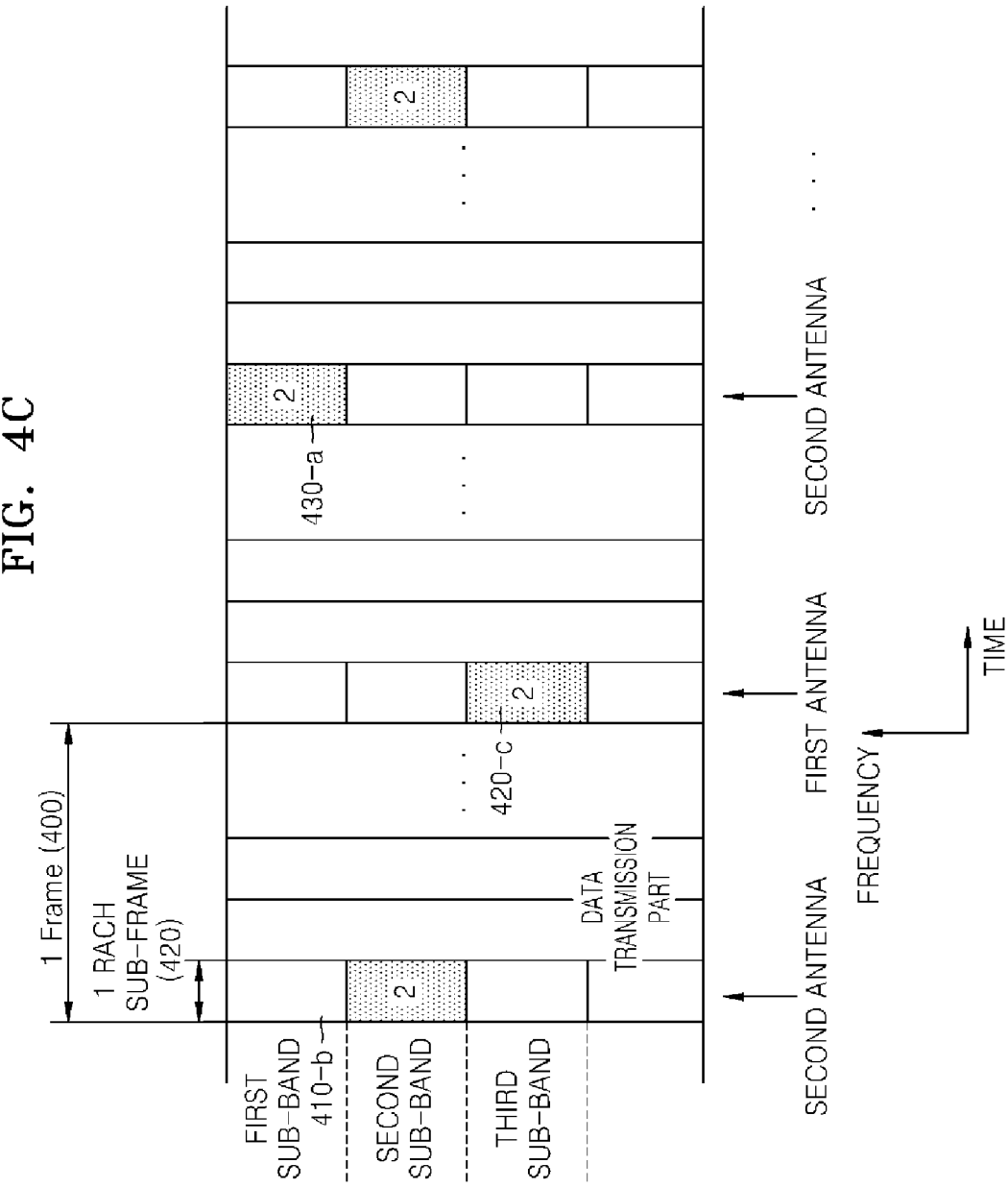

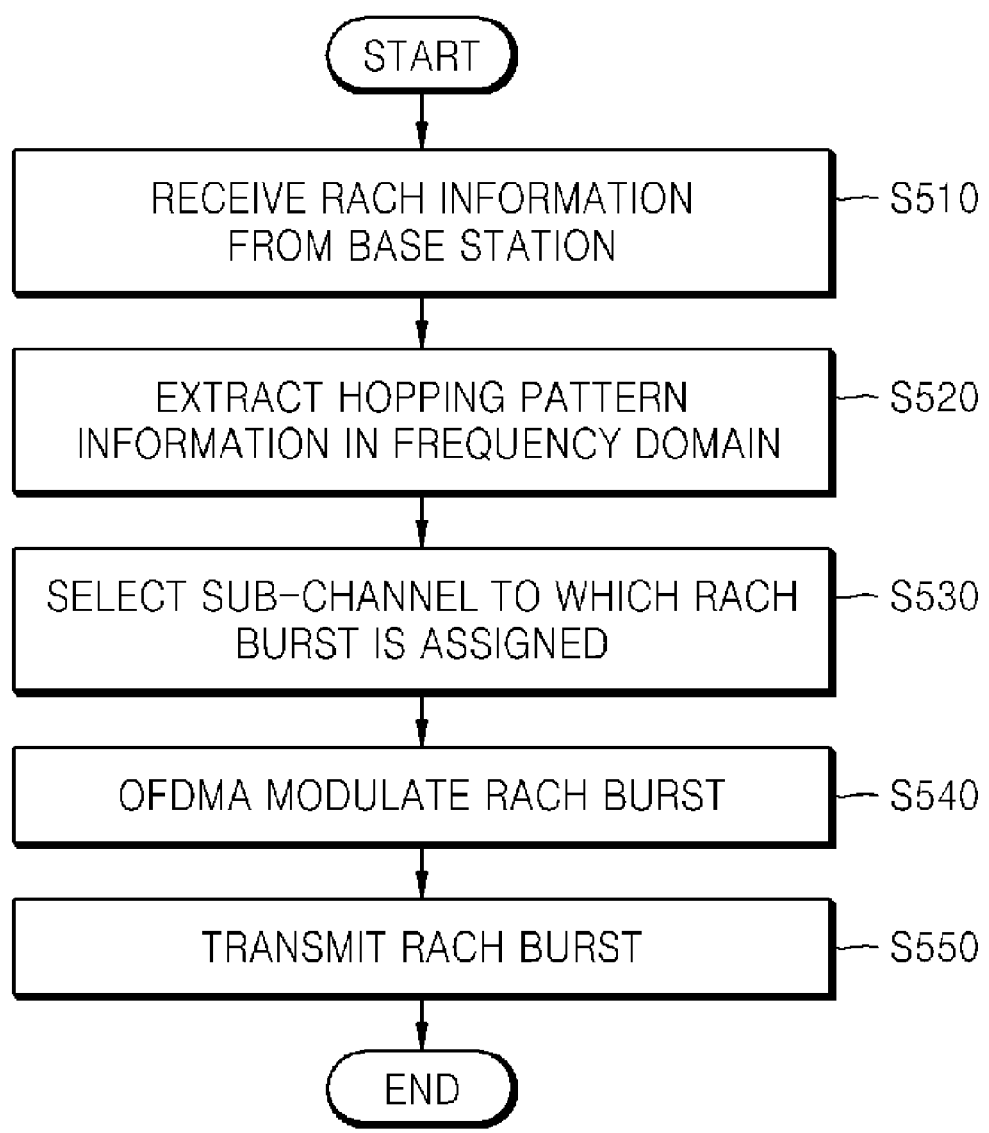

RANDOM ACCESS METHOD USING DIFFERENT FREQUENCY HOPPING PATTERNS BETWEEN NEIGHBORING CELLS AND MOBILE COMMUNICATION DEVICE

TECHNICAL FIELD

The present invention relates to a transmission method of a mobile station, and more particularly, to a random access method of a mobile station for receiving a random access channel burst hopping pattern of a cell to which the mobile station belongs from a base station and obtaining a random access transmission diversity gain using the random access channel burst hopping pattern when the mobile station tries a random access in an uplink of a cellular system.

The present invention was supported by the Information Technology (IT) Research & Development (R&D) program of the Ministry of Information and Communication (MIC) [Project management number: 2005-S-404-12, Project title: Research & Development of Radio Transmission Technology for 3G evolution].

BACKGROUND ART

At present, the $3^{rd}$ Generation Partnership Project (3GPP) is considering Orthogonal Frequency Division Multiple Access (OFDMA) as a downlink transmission method and Discrete Fourier Transform Spread OFDMA (DFT Spread OFDMA or DFT-S-OFDMA) as an uplink transmission method as candidate technologies of radio transmission technology for Long Term Evolution (LTE).

In addition, in order to prevent random access burst collision between neighboring cells when Random Access Channel (RACH) transmission is performed, using different resource areas is being considered.

The present invention suggests a method of preventing random access burst collision between neighboring cells and obtaining a diversity gain in a frequency domain by using a hopping pattern in RACH transmission of a mobile station when DFT Spread OFDMA technology is used in an uplink of a cellular system.

DETAILED DESCRIPTION OF THE INVENTION

Technical Problem

The present invention suggests a method of receiving a random access channel burst hopping pattern of a cell to which a mobile station belongs through a Broadcast Channel (BCH) and obtaining a random access transmission diversity gain using the random access channel burst hopping pattern when the mobile station tries a random access in an uplink of a cellular system using a DFT-S-OFDMA method in the uplink.

Other purposes and advantages of the present invention can be understood based on the description below and more clearly known from the embodiments of the present invention. In addition, it is easily known to one skilled in the art that the purposes and advantages of the present invention can be realized by mechanisms and a set thereof as disclosed in the claims.

Technical Solution

A mobile station according to an embodiment of the present invention can obtain a diversity gain without a Random Access Channel (RACH) burst collision by hopping according to a cell group in a frequency domain and transmitting a random access when random access resources are used between neighboring cells and detect an RACH even with low transmission power by applying switching diversity together with the frequency hopping.

DESCRIPTION OF THE DRAWINGS

The above and other features and advantages of the present invention will become more apparent by describing in detail exemplary embodiments thereof with reference to the attached drawings in which:

FIGS. 4A through 4C illustrate a method of using hopping patterns without collision between neighboring cells in a Random Access Channel (RACH) burst transmission; and FIG. 5 is a flowchart of a random access method of a mobile station according to an embodiment of the present invention.

BEST MODE

Figure 1:
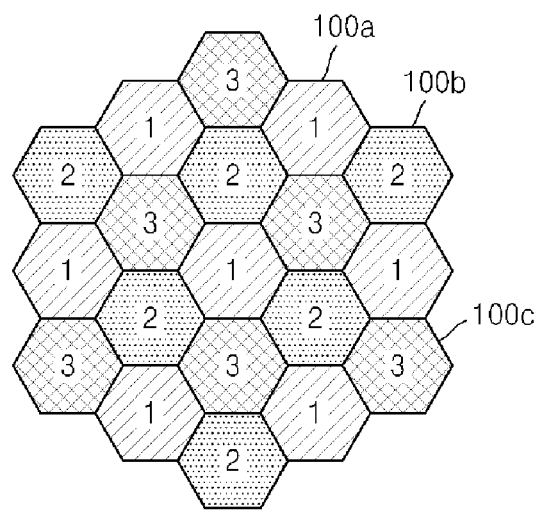
FIG. 1 illustrates neighboring cells transmitting data, which are grouped into three cell groups, according to an embodiment of the present invention.

According to an aspect of the present invention, provided is a random access method of a mobile station, the method comprising: receiving, by a mobile station belonging to a predetermined cell designed such that each neighboring cell belongs to a different group, Random Access Channel (RACH) information of a cell group to which the mobile station belongs from a base station belonging to the cell; assigning a channel to an RACH burst based on the RACH information; and transmitting the RACH burst via the assigned channel.

According to another aspect of the present invention, there is provided a mobile communication apparatus comprising: a receiver receiving, by a mobile station belonging to a predetermined cell designed such that each neighboring cell belongs to a different group, Random Access Channel (RACH) information of a cell group to which the mobile station belongs from a base station belonging to the cell; a channel assignment unit assigning a channel to an RACH burst based on the RACH information; and a transmitter transmitting the RACH burst via the assigned channel.

The RACH information may comprise an Identification (ID) of the cell group and random access hopping pattern information set to the cell group in a frequency domain, and the hopping patterns may be differently set for each cell group.

According to another aspect of the present invention, there is provided a computer readable recording medium storing a computer readable program for executing a random access method of a mobile station.

MODE OF THE INVENTION

Hereinafter, exemplary embodiments of the present invention will be described in detail with reference to the attached drawings. Like reference numerals in the drawings denote like elements. In the following description, well-known functions or constructions are not described in detail since they would obscure the invention in unnecessary detail.

In addition, when a portion "includes" a component, this means that other components are not excluded but can be further included unless there is specific description.

FIG. 1 illustrates neighboring cells transmitting data, which are grouped into three cell groups, according to an embodiment of the present invention.

In the current embodiment, physically neighboring cells transmitting data are divided into more than two cell groups, and a cell group ID and a random access hopping pattern are assigned to cells and base stations of each cell group. In the present embodiment, cells belonging to the same cell group are designed not adjacent to each other. The random access hopping patterns are differently set to each of the cell groups and can be set to be periodically changed.

Each mobile station in a cell belonging to a cell group among a plurality of cell groups transmits a Random Access Channel (RACH) to a base station in the same cell based on hopping pattern information received from the base station.

Referring to FIG. 1, neighboring cells are grouped into three groups, which are a first cell group 100a, a second cell group 100b, and a third cell group 100c.

This cell plan may be implemented by devices or set to each base station by being abstractly performed. Examples of the former are a method of installing a device generally controlling an Orthogonal Frequency Division Multiple Access (OFDMA) cellular system to perform grouping and a method of installing a device in all or partial base stations to perform grouping in association with the base stations. An example of the latter is a method in which a system manager sets cell group information into each base station by performing the above-described grouping when an Orthogonal Frequency Division Multiple Access (OFDMA) cellular system is constructed. However, since the methods described above are only examples, the present invention is not limited thereto, and various methods, which can be used in the technical field of the present invention, can be performed.

Mobile stations belonging to the cells of each cell group receive RACH information related to a corresponding cell group ID and a random access hopping pattern in a frequency domain from a Broadcast Channel (BCH) signal of corresponding base stations.

Figure 2:
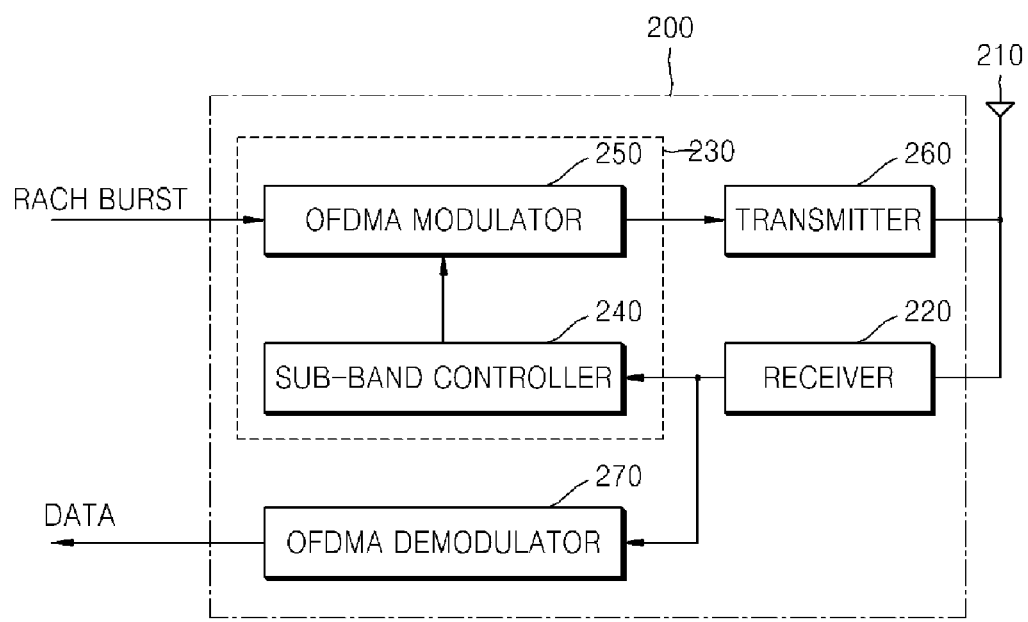
FIG. 2 is a block diagram of a mobile station according to an embodiment of the present invention.

FIG. 2 is a block diagram of a mobile station 200 according to an embodiment of the present invention.

Referring to FIG. 2, the mobile station 200, equipped with an antenna 210, includes a receiver 220, a channel assignment unit 230, a transmitter 260, and an OFDMA demodulator 270.

The receiver 220 receives an input signal via the antenna 210 from a base station in a cell to which the mobile station 200 belongs and performs processing, such as frequency transformation and analog-to-digital conversion, of the received input signal. The receiver 220 determines whether the input signal received from the base station is a BCH signal or a data signal, and if it is determined that the input signal is a BCH signal, the receiver 220 outputs the input signal to the channel assignment unit 230, and if it is determined that the input signal is a data signal, the receiver 220 outputs the input signal to the OFDMA demodulator 270. The cell to which the mobile station 200 belongs is in a cell group from among a plurality of cell groups, and cells adjacent to the cell to which the mobile station 200 belongs is in other cell groups. The BCH signal contains RACH information, such as a cell group ID of the cell to which the mobile station 200 belongs and random access hopping pattern information in a frequency domain. Random access hopping patterns are differently set to each of cell groups in order for collision not to occur between cell groups in RACH burst transmission.

The channel assignment unit 230 assigns a channel to an RACH burst based on the RACH information and includes a sub-band controller 240 and an OFDMA modulator 250.

The sub-band controller 240 extracts the cell group ID and the random access hopping pattern information in the frequency domain from the received BCH signal and generates a control signal for selecting a sub-band assigned to an RACH burst according to the random access hopping pattern information.

The OFDMA modulator 250 assigns a selected sub-band to the RACH burst and generates an RACH burst signal by performing OFDMA modulation in a predetermined method. The OFDMA modulator 250 can include a Fast Fourier Transformer (FFT), a mapper, an Inverse FFT (IFFT), a Cyclic Prefix (CP) inserter, and a parallel-to-serial converter. The FFT fast Fourier transforms the RACH burst, and the mapper maps output symbols of the FFT onto a sub-carrier of a corresponding sub-band according to the control signal of the sub-band controller 240. The IFFT inverse fast Fourier transforms an output of the mapper, the CP inserter inserts a CP into an output of the IFFT, and the parallel-to-serial converter converts a parallel output of the CP inserter into a serial output.

The transmitter 260 performs processing, such as digital-to-analog conversion and frequency transformation, of an output RACH burst signal of the OFDMA modulator 250 and transmits a result to the base station via the antenna 210.

The OFDMA demodulator 270 restores data by performing OFDMA demodulation of the received data signal in a predetermined method.

Figure 3A:
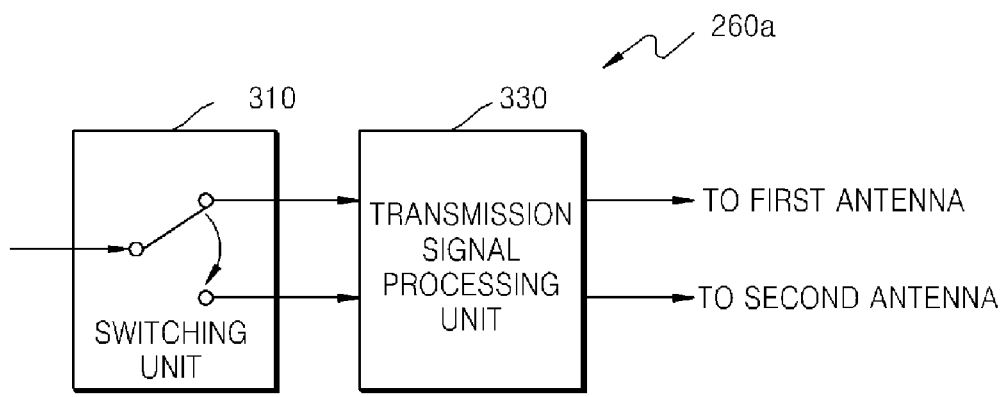
FIGS. 3A and 3B are block diagrams of a transmitter of a mobile station having two antennas, according to embodiments of the present invention.
Figure 3B:
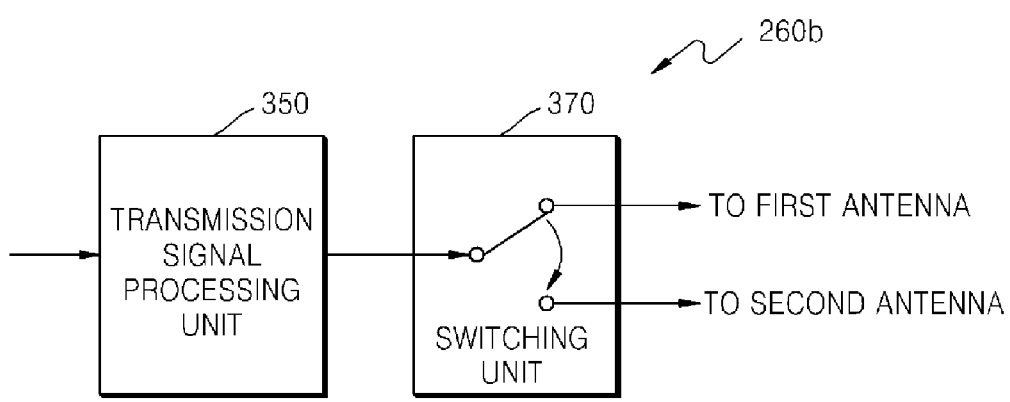

FIGS. 3A and 3B are block diagrams of the transmitter 260 of the mobile station 200 having two transmission antennas, according to embodiments of the present invention.

When the mobile station 200 has two transmission antennas (first and second antennas) (not shown), the receiver 220 illustrated in FIG. 2 receives RACH information from one of the two transmission antennas, and the transmitter 260 illustrated in FIG. 2 transmits an RACH burst signal to a base station by alternately using the two transmission antennas.

Referring to FIG. 3A, the transmitter 260 (as referred to 260A) includes a switching unit 310 and a transmission signal processing unit 330.

The switching unit 310 selects an antenna through which an RACH burst signal is to be transmitted from among the two transmission antennas according to a predetermined method and outputs the RACH burst signal to the transmission signal processing unit 330 connected to the selected antenna (the first or second antenna).

The transmission signal processing unit 330 performs processing, such as digital-to-analog conversion and frequency transformation, of the RACH burst signal input from the switching unit 310 and transmits the processed signal to a base station via the selected antenna.

Referring to FIG. 3B, the transmitter 260 (as referred to 260B) includes a transmission signal processing unit 350 and a switching unit 370.

The transmission signal processing unit 350 performs processing, such as digital-to-analog conversion and frequency transformation, of an RACH burst signal input from the OFDMA modulator 250 illustrated in FIG. 2.

The switching unit 370 connects the transmission signal processing unit 350 to the first or second antenna so that the RACH burst signal is alternately transmitted via the first and second antennas, selects a transmission antenna according to a predetermined method, such as Time-Switched Transmission Diversity (TSTD), and transmits the output signal of the transmission signal processing unit 350 via the selected antenna.

Figure 4A:
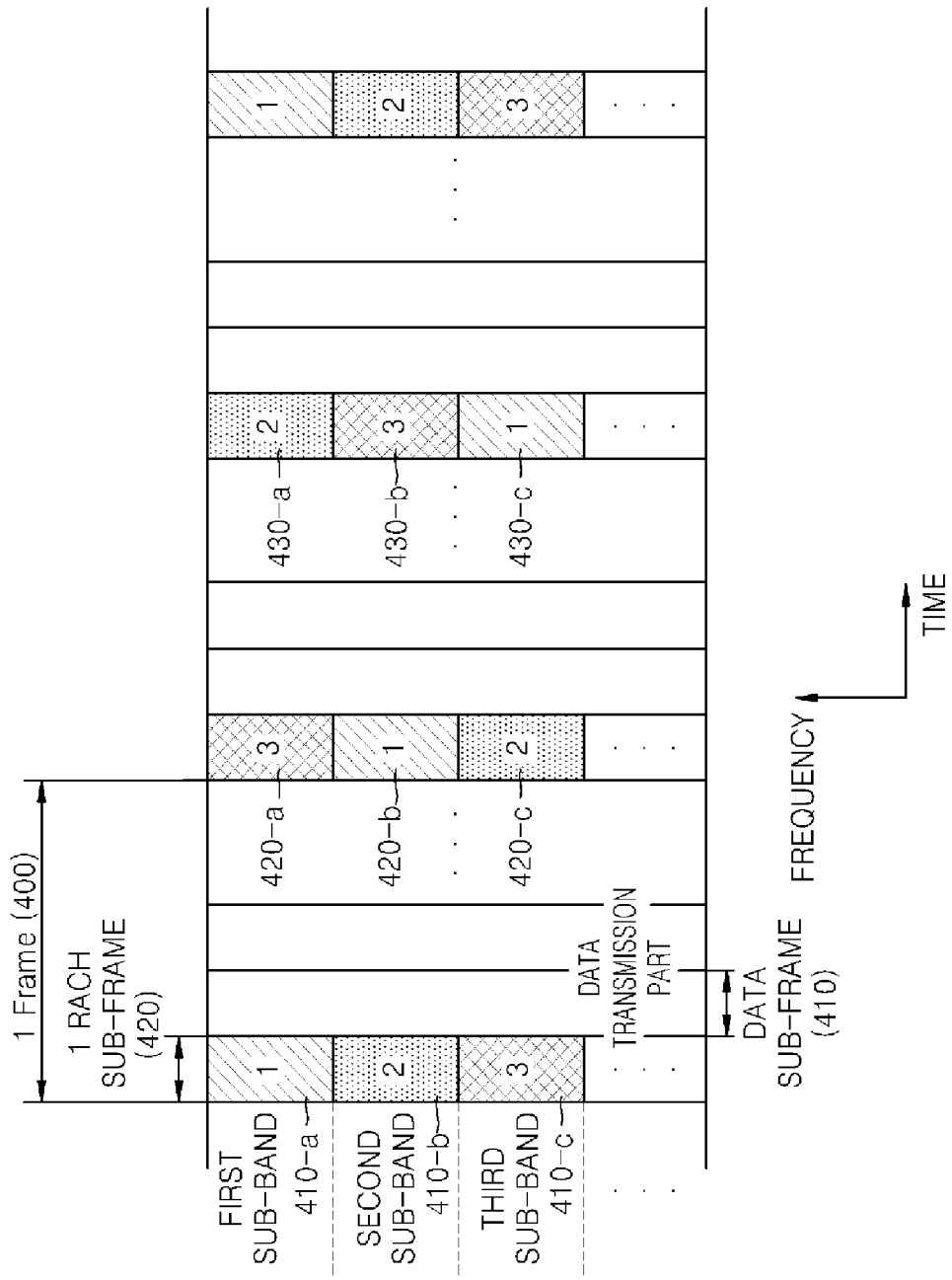

FIGS. 4A through 4C illustrate a method of using hopping patterns without collision between neighboring cells in an RACH burst transmission.

This illustration is described using a $3^{rd}$ Generation Long Term Evolution (3G LTE) uplink frame structure in a Discrete Fourier Transform Spread OFDMA (DFT-S) OFDMA method and described with an example in which each mobile station transmits an RACH burst signal.

Referring to FIG. 4A, a radio frame 400 constitutes of an RACH transmission part for RACH burst transmission and a data transmission part for packet data transmission. The data transmission part includes a plurality of data sub-frames 410, and the RACH transmission part includes one or more RACH sub-frames 420. Each RACH sub-frame 420 is divided into a plurality of sub-bands. A mobile station uses only one sub-band from among the sub-bands in an RACH sub-frame when the mobile station transmits an RACH burst signal.

A mobile station belonging to the first cell group 100a of FIG. 1 can transmit an RACH burst signal by hopping the sub-bands 410-a, 420-b, and 430-c when the RACH burst signal is transmitted along a time axis, and a mobile station belonging to the second cell group 100b of FIG. 1 can transmit an RACH burst signal by hopping sub-bands 410-b, 420-c, and 430-a.

Referring to FIGS. 4B and 4C, when antenna switching is additionally introduced, the mobile station belonging to the first cell group 100a of FIG. 1 can transmit an RACH burst signal by hopping sub-bands and switching antennas, such as sub-band 410-a/first antenna, sub-band 420-b/second antenna, and sub-band 430-c/first antenna, and the mobile station belonging to the second cell group 100b of FIG. 1 can transmit an RACH burst signal by hopping sub-bands and switching antennas, such as sub-band 410-b/second antenna, sub-band 420-c/first antenna, and sub-band 430-a/second antenna.

By doing this, mobile stations and base stations according to an embodiment of the present invention can prevent collision by transmitting an RACH burst signal using resources different from those of neighboring cells and obtain a diversity effect in the frequency domain by hopping in the frequency domain, thereby significantly increasing a random access signature detection probability of a mobile station.

In addition, a mobile station according to an embodiment of the present invention transmits a random access burst by hopping with information related to a cell group ID and a hopping pattern received from a BCH signal of a base station when transmitting a DFT-S-OFDMA modulated random access burst for a random access trial, and if the mobile station has two or more antennas, by introducing switching diversity for alternate transmission, the random access signature detection probability can be increased more.

FIG. 5 is a flowchart of a random access method of a mobile station according to an embodiment of the present invention.

Referring to FIG. 5, the mobile station receives RACH information of a cell group to which the mobile station belongs from a base station belonging to the same cell as that to which the mobile station belongs via an antenna in operation S510. The RACH information includes a cell group ID and hopping pattern information in a frequency domain, which is set to the cell group, and is acquired from a BCH signal of the base station. The received hopping pattern is differently set for each of cell groups.

The mobile station assigns a channel to an RACH burst based on the RACH information. In more detail, the mobile station extracts the hopping pattern information in the frequency domain, which is set to the cell group, from the RACH information in operation S520, selects a sub-channel (sub-band) through which the RACH burst is transmitted according to the extracted hopping pattern in operation S530, and generates an RACH burst signal by assigning the selected sub-channel to the RACH burst and OFDMA modulating the RACH burst in operation S540.

The mobile station transmits the RACH burst using the assigned sub-channel in operation S550. If the mobile station has two or more transmission antennas, the mobile station transmits the RACH burst by selecting an antenna through which the RACH burst is to be transmitted from among the transmission antennas and signal processing the RACH burst or transmits the RACH burst by signal processing the RACH burst and selecting an antenna through which the signal-processed RACH burst is to be transmitted from among the transmission antennas.

Although a mobile station using the DFT-S-OFDMA modulation method as an OFDMA modulation method is illustrated for the convenience of description in the present invention, it is fully understood by one of ordinary skill in the art that the present invention can be applied to mobile stations using a conventional OFDMA modulation method instead of the DFT-S-OFDMA modulation method of the present invention.

In addition, although a mobile station having one or two antennas is illustrated for the convenience of description in the present invention, it is fully understood by one of ordinary skill in the art that the present invention can be applied to mobile stations having a plurality of transmission antennas.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While this invention has been particularly shown and described with reference to preferred embodiments thereof, it is understood by one of ordinary skill in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

ADVANTAGEOUS EFFECTS

As described above, according to the present invention, a mobile station can obtain a diversity gain without an RACH burst collision by hopping according to a cell group in a frequency domain and transmitting a random access when random access resources are used between neighboring cells, thereby increasing the RACH signature detection probability of a base station.

In addition, by applying switching diversity together with the frequency hopping, RACH detection can be performed even with low transmission power as compared to when the switching diversity is not applied, thereby expanding cell coverage of an uplink.

The invention claimed is:

1. A random access method of a mobile station, the method comprising:
   receiving, by a mobile station belonging to a predetermined cell designed such that each neighboring cell belongs to a different group, Random Access Channel (RACH) information of a cell group to which the mobile station belongs, from a base station belonging to the cell; and
   assigning a channel to an RACH burst based on the RACH information;
   transmitting the RACH burst via the assigned channel,
   wherein the RACH information comprises an Identification (ID) of the cell group and random access hopping pattern information set to the cell group in a frequency domain.

2. The method of claim 1, wherein the random access hopping pattern is differently set for each cell group.

3. A computer readable recording medium storing a computer readable program for executing the method of claim 2.

4. A computer readable recording medium storing a computer readable program for executing the method of claim 1.

5. A random access method of a mobile station, the method comprising:
   receiving, by a mobile station belonging to a predetermined cell designed such that each neighboring cell belongs to a different group, Random Access Channel (RACH) information of a cell group to which the mobile station belongs from a base station belonging to the cell;
   assigning a channel to an RACH burst based on the RACH information; and
   transmitting the RACH burst via the assigned channel,
   wherein the assigning of the channel comprises:
      extracting a random access hopping pattern information set to the cell group from the RACH information;
      selecting a sub-channel through which the RACH burst is transmitted according to the extracted random access hopping pattern information; and
      assigning the selected sub-channel to the RACH burst and Orthogonal Frequency Division Multiple Access (OFDMA) modulating the RACH burst.

6. The method of claim 5, wherein the transmitting of the RACH burst comprises:
   selecting an antenna through which the RACH burst is transmitted from among a plurality of transmission antennas; and
   signal processing the RACH burst and transmitting the signal-processed RACH burst.

7. A computer readable recording medium storing a computer readable program for executing the method of claim 6.

8. The method of claim 5, wherein the transmitting of the RACH burst comprises:
   signal processing the RACH burst; and
   selecting an antenna through which the signal-processed RACH burst is transmitted from among a plurality of transmission antennas.

9. A computer readable recording medium storing a computer readable program for executing the method of claim 8.

10. The method of claim 5, wherein the OFDMA modulation comprises Discrete Fourier Transform Spread OFDMA (DFT-S-OFDMA) modulation.

11. A computer readable recording medium storing a computer readable program for executing the method of claim 5.

12. A mobile communication apparatus comprising:
   a receiver receiving, by a mobile station belonging to a predetermined cell designed such that each neighboring cell belongs to a different group, Random Access Channel (RACH) information of a cell group to which the mobile station belongs from a base station belonging to the cell;
   a channel assignment unit assigning a channel to an RACH burst based on the RACH information; and
   a transmitter transmitting the RACH burst via the assigned channel,
   wherein the RACH information comprises an Identification (ID) of the cell group and random access hopping pattern information set to the cell group in a frequency domain.

13. The mobile communication apparatus of claim 12, wherein the random access hopping pattern is differently set for each cell group.

14. A mobile communication apparatus comprising:
   a receiver receiving, by a mobile station belonging to a predetermined cell designed such that each neighboring cell belongs to a different group, Random Access Channel (RACH) information of a cell group to which the mobile station belongs from a base station belonging to the cell;
   a channel assignment unit assigning a channel to an RACH burst based on the RACH information; and
   a transmitter transmitting the RACH burst via the assigned channel,
   wherein the channel assignment unit comprises:
      a controller extracting a random access hopping pattern information set to the cell group from the RACH information and selecting a sub-channel through which the RACH burst is transmitted according to the extracted random access hopping pattern information; and
      an Orthogonal Frequency Division Multiple Access (OFDMA) modulator assigning the selected sub-channel to the RACH burst and OFDMA modulating the RACH burst.

15. The mobile communication apparatus of claim 14, wherein the transmitter comprises:
   a switching unit selecting an antenna through which the RACH burst is transmitted from among a plurality of transmission antennas; and
   a transmission signal processing unit signal-processing the RACH burst and transmitting the signal-processed RACH burst.

16. The mobile communication apparatus of claim 14, wherein the transmitter comprises:
   a transmission signal processing unit signal-processing the RACH burst; and
   a switching unit selecting an antenna through which the signal-processed RACH burst is transmitted from among the transmission antennas.

17. The mobile communication apparatus of claim 14, wherein the OFDMA modulation comprises Discrete Fourier Transform Spread OFDMA (DFT-S-OFDMA) modulation.

* * * * *